(12) United States Patent
Finkelstein et al.

(10) Patent No.: US 8,478,880 B2
(45) Date of Patent: Jul. 2, 2013

(54) DEVICE PROFILE-BASED MEDIA MANAGEMENT

(75) Inventors: Jeff Finkelstein, San Francisco, CA (US); Matthew W. Crowley, Los Altos, CA (US)

(73) Assignee: Palm, Inc., Sunnyvale, CA (US)

( * ) Notice: Subject to any disclaimer, the term of this patent is extended or adjusted under 35 U.S.C. 154(b) by 869 days.

(21) Appl. No.: 11/897,982

(22) Filed: Aug. 31, 2007

(65) Prior Publication Data

US 2009/0063703 A1    Mar. 5, 2009

(51) Int. Cl.
  *G06F 15/16*     (2006.01)
  *G06F 15/173*    (2006.01)
(52) U.S. Cl.
  USPC ............ 709/227; 709/240; 709/242
(58) Field of Classification Search
  None
  See application file for complete search history.

(56) References Cited

U.S. PATENT DOCUMENTS

| | | | |
|---|---|---|---|
| 5,530,693 A | 6/1996 | Averbuch et al. | |
| 5,758,088 A | 5/1998 | Bezaire et al. | |
| 5,784,562 A | 7/1998 | Diener | |
| 5,872,926 A | 2/1999 | Levac et al. | |
| 5,974,461 A | 10/1999 | Goldman et al. | |
| 5,999,942 A | 12/1999 | Talati | |
| 6,055,424 A | 4/2000 | Tornqvist et al. | |
| 6,107,944 A | 8/2000 | Behr et al. | |
| 6,134,582 A | 10/2000 | Kennedy | |
| 6,151,628 A | 11/2000 | Xu et al. | |
| 6,167,426 A | 12/2000 | Payne et al. | |
| 6,167,441 A | 12/2000 | Himmel | |
| 6,219,694 B1 | 4/2001 | Lazaridis et al. | |
| 6,285,683 B1 | 9/2001 | Lin | |
| 6,336,135 B1 | 1/2002 | Niblett et al. | |
| 6,393,569 B1 | 5/2002 | Orenshteyn | |
| 6,442,687 B1 | 8/2002 | Savage | |
| 6,462,646 B2 | 10/2002 | Helferich | |
| 6,477,543 B1 | 11/2002 | Huang et al. | |
| 6,484,150 B1 | 11/2002 | Blinn et al. | |
| 6,546,425 B1 | 4/2003 | Hanson et al. | |
| 6,606,486 B1 | 8/2003 | Cubbage et al. | |
| 6,618,763 B1 | 9/2003 | Steinberg | |
| 6,636,733 B1 | 10/2003 | Helferich | |
| 6,647,409 B1 | 11/2003 | Sherman et al. | |
| 6,671,355 B1 | 12/2003 | Spielman et al. | |
| 6,763,377 B1 * | 7/2004 | Belknap et al. | ............... 709/223 |

(Continued)

FOREIGN PATENT DOCUMENTS

| EP | 1914640 A1 | 4/2008 |
|---|---|---|
| GB | 2331600 A | 5/1999 |

(Continued)

OTHER PUBLICATIONS

Ecrio and Lucent Sign Global Partnership Aimed at Bringing Rich Instant Messaging Solutions to Mobile Operators, viewed Apr. 14, 2005, 2 pages, Ecrio Inc. Copyright 2004, http://www.ecrio.com/pressre10.html.

(Continued)

*Primary Examiner* — Umar Cheema (57) ABSTRACT

A server configured to provide media to devices remote from the server is configured to provide different media to different devices at substantially a same time. The is server configured to recognize a device that requests media. The server is configured to automatically set a resolution at which a media is provided to the device based on the recognition of the device.

15 Claims, 5 Drawing Sheets

U.S. PATENT DOCUMENTS

| | | | |
|---|---|---|---|
| 6,810,405 B1* | 10/2004 | LaRue et al. | 707/613 |
| 6,819,945 B1 | 11/2004 | Chow et al. | |
| 6,847,632 B1 | 1/2005 | Lee et al. | |
| 6,888,927 B1 | 5/2005 | Cruickshank et al. | |
| 6,917,806 B2 | 7/2005 | Chng et al. | |
| 6,941,326 B2 | 9/2005 | Kadyk et al. | |
| 7,003,663 B2 | 2/2006 | Lagosanto et al. | |
| 7,051,080 B1 | 5/2006 | Paul et al. | |
| 7,092,998 B2 | 8/2006 | Frietas et al. | |
| 7,203,477 B2 | 4/2007 | Coppinger et al. | |
| 7,218,921 B2 | 5/2007 | Mendiola et al. | |
| 7,266,365 B2 | 9/2007 | Ferguson et al. | |
| 7,325,028 B1 | 1/2008 | Smith et al. | |
| 7,362,311 B2 | 4/2008 | Filner et al. | |
| 2001/0016845 A1 | 8/2001 | Tribbensee | |
| 2002/0002596 A1 | 1/2002 | Sugiarto et al. | |
| 2002/0065064 A1 | 5/2002 | Griffith et al. | |
| 2002/0083322 A1 | 6/2002 | Lagosanto et al. | |
| 2002/0143971 A1 | 10/2002 | Govindarajan et al. | |
| 2002/0156833 A1 | 10/2002 | Maurya et al. | |
| 2002/0174106 A1 | 11/2002 | Martin | |
| 2002/0184418 A1* | 12/2002 | Blight | 710/100 |
| 2003/0050046 A1* | 3/2003 | Conneely et al. | 455/412 |
| 2003/0078960 A1 | 4/2003 | Murren et al. | |
| 2005/0160113 A1* | 7/2005 | Sipusic et al. | 707/104.1 |
| 2005/0176451 A1 | 8/2005 | Helferich | |
| 2006/0013368 A1 | 1/2006 | LaBaw | |
| 2006/0085543 A1* | 4/2006 | Hrastar et al. | 709/224 |
| 2006/0161635 A1* | 7/2006 | Lamkin et al. | 709/217 |
| 2006/0235945 A1 | 10/2006 | Frietas et al. | |
| 2006/0242278 A1 | 10/2006 | Hawkins | |
| 2008/0010122 A1* | 1/2008 | Dunmire et al. | 705/14 |

FOREIGN PATENT DOCUMENTS

| | | | |
|---|---|---|---|
| WO | WO 01/93097 | * | 12/2001 |
| WO | WO01/93097 A2 | | 12/2001 |
| WO | WO2008/023270 A2 | | 2/2008 |

OTHER PUBLICATIONS

International Search Report PCT/US01/00946; mailed Apr. 10, 2001, 6 pages.

Office Action for U.S. Appl. No. 10/159,545, date mailed Aug. 12, 2005, 14 pages.

Office Action for U.S. Appl. No. 10/159,545, date mailed Feb. 6, 2006, 13 pages.

Office Action for U.S. Appl. No. 10/159,545, date mailed Jan. 24, 2007, 13 pages.

Office Action for U.S. Appl. No. 10/159,545, date mailed Jul. 31, 2007, 15 pages.

Office Action for U.S. Appl. No. 10/159,545, date mailed Feb. 22, 2008, 21 pages.

Office Action for U.S. Appl. No. 10/159,545, date mailed Sep. 19, 2008, 19 pages.

Office Action for U.S. Appl. No. 10/159,545, date mailed Apr. 9, 2009, 21 pages.

Office Action for U.S. Appl. No. 11/426,534, date mailed Dec. 28, 2007, 5 pages.

Office Action for U.S. Appl. No. 11/426,534, date mailed Jul. 3, 2008, 8 pages.

Office Action for U.S. Appl. No. 11/426,534, date mailed Feb. 24, 2009, 13 pages.

U.S. Appl. No. 11/726,712, filed Mar. 22, 2007, Chambers.

Office Action for U.S. Appl. No. 10/159,545, mail date Sep. 11, 2009, 21 pages.

Notice of Allowance and Fees Due for U.S. Appl. No. 10/159,545, mail date Nov. 23, 2009, 13 pages.

* cited by examiner

DEVICE PROFILE-BASED MEDIA MANAGEMENT

BACKGROUND

The present invention relates generally to the field of wireless media transfer.

Smart phones and other portable devices (e.g. laptops) have been provided which can access and play content (e.g. media) from the Internet. A new device has been introduced by Palm, Inc. which can interact with smart phones that have lower resolution and/or smaller screens than the device. The device is designed to transfer data between the device and the smart phone. The device is also configured such that it can play media.

Another device available to consumers is a Slingbox. The Slingbox is configured to provide streaming media to a device (e.g. smartphone, laptop, etc.) that contains a proprietary "slingplayer" application. The slingbox is configured to stream the media over a network such as a local area network in a user's home and/or the Internet. The slingbox system is designed to optimize the data transmission frame rate based on the data connection of the device and may or may not do so based on other factors. The slingbox receives the media it provides from other media sources such as a cable box, DVR (e.g. a TiVo brand DVR), or other media source through an A/V cable connection to the source. The slingplayer may be used to control the video source via the slingbox where the slingbox is provided with an IR blaster designed to send IR signals to the source. One model of the slingbox provides connection to multiple different media sources whose media can be streamed over the Internet.

DETAILED DESCRIPTION OF THE PREFERRED EMBODIMENTS

Figure 1:
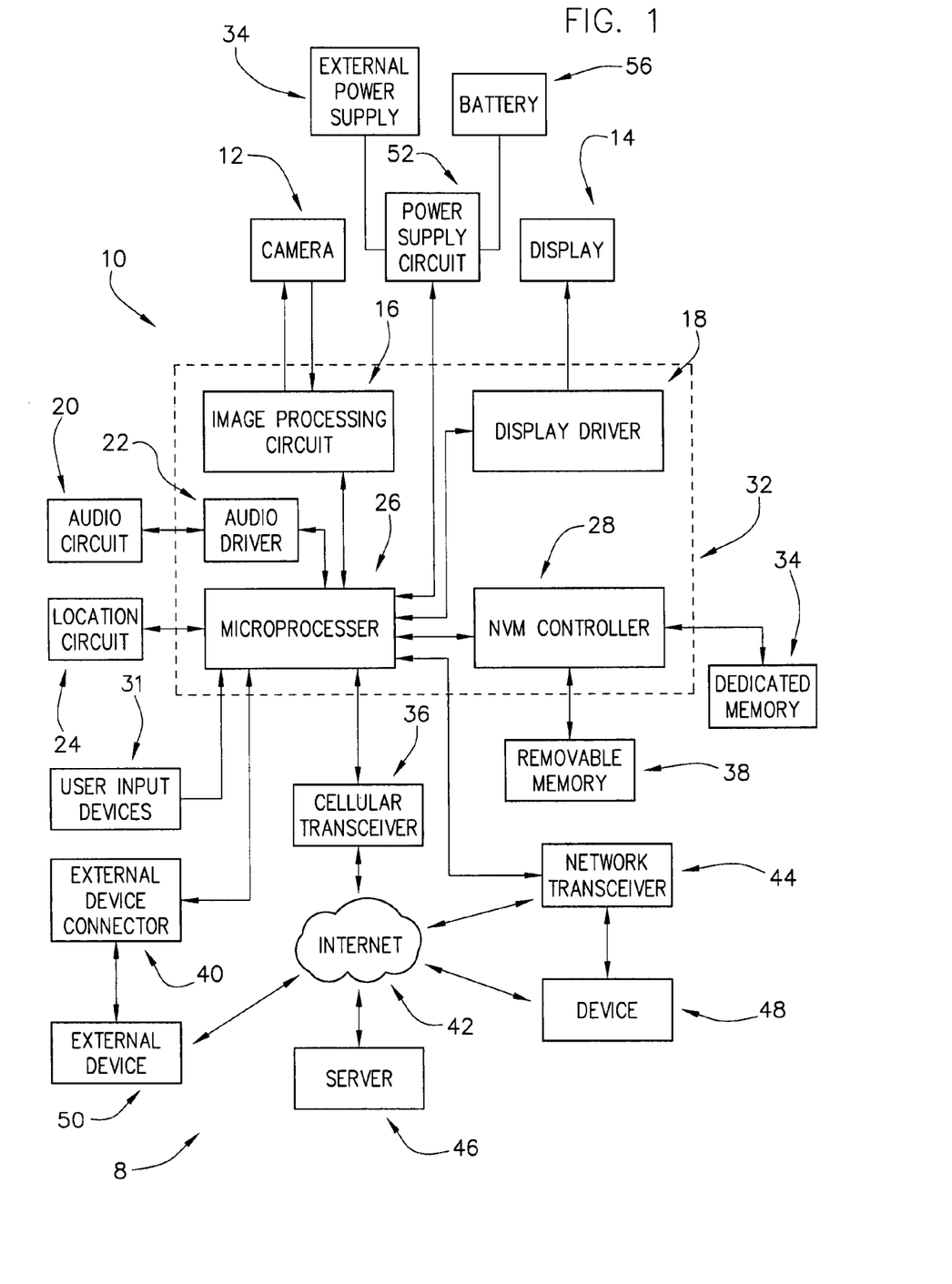
FIG. 1 is a component diagram of a device according to one embodiment.

Referring to FIG. 1, a system 8 includes portable electronic device 10 capable of accessing a server 46 over a network 42 (e.g. a wide area network such as the Internet, a local area network, etc.). Device 10 may access server 46 using a cellular transceiver 36, a network transceiver 44, or some other transmitting and/or receiving component. Device 10 may be configured to access server 46 to obtain playable media from server 46. Device 10 may be configured to play this media accessed from server 46 by outputting the media using a display 14 and/or audio circuit 20.

Device 10 may also be configured to be able to communicate with another device 48, 50. Device 10 may communicate directly with device 48,50 (e.g. with a point to point network transceiver protocol such as the Bluetooth protocol, and/or an ultrawideband (UWB) protocol) and/or may communicate indirectly (e.g. over a network 42 using a network transceiver 44).

Device 10 may be configured to transfer data such as media data received from server 46 to device 48,50. A processing circuit 32 of device 10 may be configured to process the data that is transferred, or may be configured to act primarily as a conduit for the data.

Device 10 may have a lower resolution than device 48, 50. Device 10 may be configured to access media at its resolution from server 46 when the media is to be played on its display 14, but access media at the resolution of the display of device 48, 50 when the media is to be passed on to device 48, 50 from device 10 to be displayed on the display of device 48, 50.

Device 48, 50 may also have one or more of the components shown for device 10.

Figure 3:
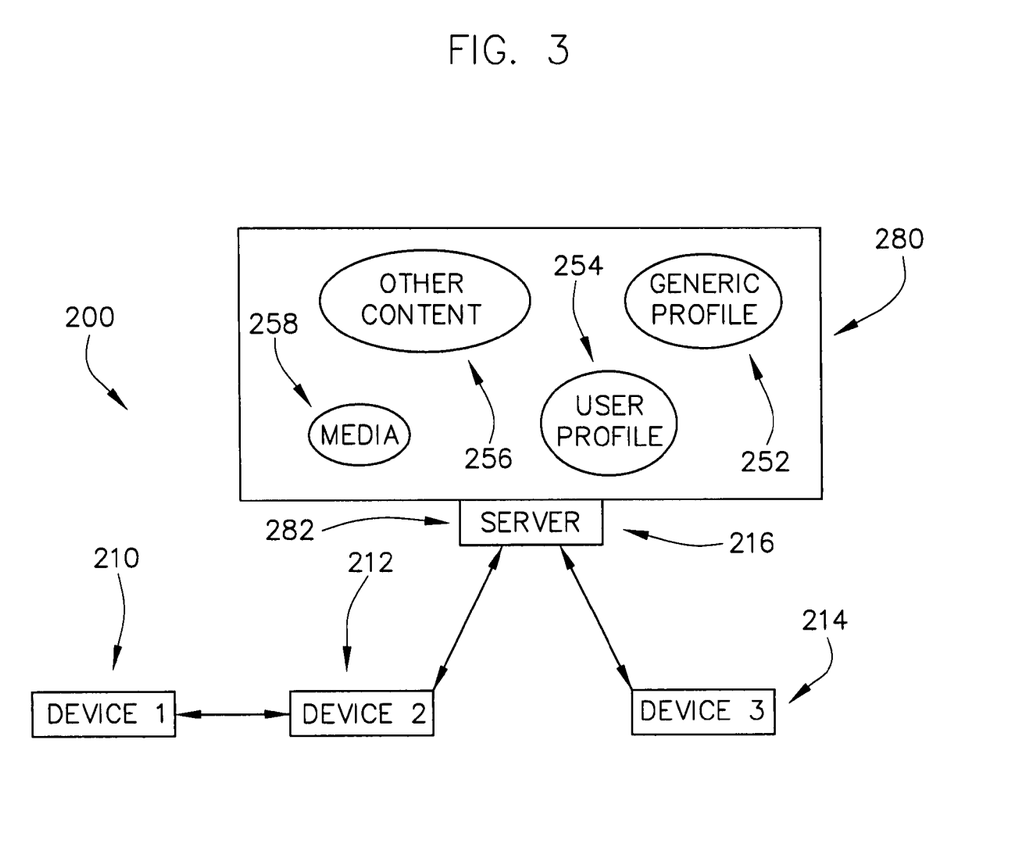
FIG. 3 is a system diagram according to one embodiment.

Referring to FIG. 3, a system 200 for transferring data includes a server system 216 that provides media content to devices 210-214. Server system 216 includes user profiles 254. A user profile 254 may be established when a user registers for a service provided using the server system 216, or may be created on the fly when a user logs into a service provided using server system 216. Server system 216 may create the specific user profile 254 based on generic profiles 252. For example, server system 216 may include various generic device profiles containing information relating to various devices (e.g. maximum resolution, maximum data transfer rate, supported media types, etc.). A user may then indicate which device or devices he will use to access the server. The server may then access the device profiles to configure a user's profile. A user may further customize these settings.

Server system 216 also includes media 258 (video, audio, etc.) and other content 256 that it can provide to devices 210-214 that are in communication with server 216. Including media 258 and other content 256 may comprise storing the media on a memory of the server, and/or may include storing links to media stored elsewhere (e.g. on a different server) that can be accessed using the server (e.g. via an Internet or other network connection). Server system 216 may be configured such that it can format the media based on the user profile of the user.

A device 210-214 may request media from server system 216. Devices 210-214 may request media using information stored on devices 210-214, by using a browser or other application to access information of available media from server system 216, etc. To access media, a device 210-214 may log in to server system 216. Logging in to and/or accessing media from server system 216 may comprise sending, to server system 216, a device ID or other data that uniquely identifies the device being used to access the media. Logging into and/or accessing media from server system 216 may include sending (e.g. pushing) system information to server system 216. System information may include information such as screen resolution, maximum data transfer rate, type of networking device being used to access the media, etc. Logging in to server system 216 may include entering a password which may be entered manually by a user and/or may be automatically transmitted by the device.

When media is accessed from server system 216, server system 216 may be configured to format the media based on the user profile prior to transmitting the media to devices 210-214. Formatting the media may include adjusting the resolution of the media based on the user profile, adjusting a frame rate based on the user profile, adjusting the total bandwidth of the media based on the user profile, setting maximum parameters for each of these values based on the user profile, etc. Server system 216 may also be configured to test parameters used to transmit data. For example, server system 216 may be configured to "ping" or otherwise test the data transfer rate of the media from its source (e.g. the server) to its destination (e.g. one or more of devices 210-214). As another example, server system 216 may be configured to request resolution information (e.g. the resolution at which the user is actually playing back the media) from devices 210-214. Server system 216 may adjust any of the above-mentioned parameters based on the testing.

User profiles 254 may contain information in addition to device-related information. For example, user profiles 254 may include media-related information specific to a particular user. As examples, the user profile may include information about what types of groups of media and/or media services are available to a user, what types of media the user can access from each registered device, pointers to recently viewed media by a user, saved pointers related to a user's favorite media (e.g. media a user saved as a favorite and/or media which a user views frequently), location information related to media (e.g. the point in time at which the user is and/or last was in a variable/playable media), etc.

A user profile may be a single file, may include multiple files which, together, form the total profile for the user (which files may be stored together or separately, and which may be linked or have no link other than their association with a particular user), or may take some other form which stores information relating to and/or about a user.

The media may be sent by server system 216 to devices 210-214 by streaming or otherwise "playing" the media. The media may be streamed by server system 216 over a network such as a local area network or a wide area network (e.g. the Internet). The media may also be accessed by server system over a network such as a local area network or a wide area network. Devices 212-214 may receive the media using any number of network devices. In particular, devices 212-214 may use a wireless networking device such as a WiFi, cellular, and/or WiMax transceiver (e.g. transmitter, receiver, or combined transmitter-receiver) to receive the media.

In some embodiments, a user may use a device 212 as a conduit for a device 210 to receive the media. Server 216 may then transmit data to either device 212 or device 210 through a common channel (e.g. a data connection made by a network transceiver of device 212, a data connection made by a cellular transceiver of device 212, a data connection made by other network—e.g. Internet—access circuitry of device 212, etc.). Device 212 may simply act as a modem for the first device 210, or devices 210, 212 may interact cooperatively to access the media.

Both devices 210, 212 may be able to play the media and/or may be registered in a user profile as a connecting device for a particular user. Additionally, other devices (e.g. device 214) may also be registered within a user's profile. In addition to devices that are permanently registered, other devices may be granted access to data which may be stored in a user's profile.

Server system 216 may include a user profile 254 that includes profiles for one or both of devices 210, 212 and/or server may receive device configuration information from one or both of devices 210, 212. Server system 216 may be configured to optimize the media parameters (e.g. those discussed above) for transmitting the media to each of devices 210, 212. For example, server system 216 may transmit the media at the resolution of the device 210, 212 on which media is being played so that device 210, 212 will not need to alter the resolution of the media before playing the media (e.g. before playing at the maximum resolution of the device, the actual resolution being used by the device, etc.).

In some embodiments where device 212 serves as a conduit for device 210, a user may decide to view a single media being streamed on one or both of devices 210, 212. As one example, a user may be playing (viewing, listening to, etc.) media on an easily portable but low resolution handheld device (e.g.

device 210) and then decide to start accessing that same media on a larger, higher resolution. As another example, a user might be accessing media on a higher resolution device, need to close the higher resolution device, and decide to switch over to a lower resolution device.

A switch between which devices are playing the media may be automatic. For example, a first device 210, 212 may be configured to monitor the other device 210, 212 such that the first device will detect a change in the other device. As another example, when a change occurs in a first device 210, 212, the first device 210, 212 may be configured to send a message to a second device indicating that a change has occurred. In response to identifying that a change has occurred in either example, the device may be configured to automatically make the switch.

In some cases, the first and/or second device 210, 212 may be configured such that a media viewing application is launched on that device based on actions taken on the other device. For example, if media is being played on the first device 210 and the first device is abruptly shut down, a media application may be launched on the second device 212 to continue to play that media. As another example, when media is being played on a second device 212 and a first device 210 becomes available (turned on, has a media application launched, etc.), the first device 210 may pick up playing the media file at the same point as the second device 212. As another example, a user may have a user input control that allows a user to "push" the media from one of the first and second devices to the other of the first and second devices (i.e. cause media to be viewed on the other device). Media may cease to be played or may continue to be played on the device from which the media was pushed. When media is pushed from one device to another, the device onto which the media was pushed may be configured to launch an appropriate media playing application in response to the push.

Server system 216 may be configured to identify that a user has switched from (or has added to) playing the media on one of the first 210 and second 212 devices to the other device and dynamically switch the transmission of the media from a format (e.g. file format of the media, resolution, etc.) optimized for one device 210, 212 to a format optimized for the other device 210, 212. For example, server system 216 may be configured to dynamically switch the format of the media based on receipt of an indication from the first and/or second device 210, 212 that a change has been made (e.g. server system 216 may receive an indication that the first device 210 has started or is shut down, server system 216 may fail to receive an indication that the first device is running, or may receive some other indication regarding which device is being used to play the media). When multiple devices are being used to play media from a single data connection to server system 216, server system 216 may send a single media transmission having parameters that encompass all devices (e.g. the highest resolution used by the devices, the highest frame rate used by the devices, etc.), may send multiple transmissions where every device will not use every transmission (e.g. a high resolution transmission portion for a high resolution device and a low resolution transmission portion for a low resolution device, a low resolution transmission for the lower resolution device and a supplemental transmission for the higher resolution device, etc.), and/or may send some other data.

Server system 216 may be configured to dynamically switch (e.g. switching without a user request to switch) media transmission parameters only if certain conditions are met. For example, server system 216 may be configured to dynamically switch media transmission parameters only when two devices are accessing server 216 through a common channel. As another example, server system 216 may only dynamically switch media transmission parameters when a change is registered and a user has not requested that the media transmission be paused, stopped, closed, ended, and/or some other user action relating to a user pause in playing the media.

Dynamic switching may also be enabled locally rather than in the server. For example, when a first device 210 hands media playback to a second device 212, first device 410 may pass along information to second device 212 such that second device 212 can seamlessly (or substantially seamlessly) pick up where first device 210 left off, and/or start playing the media, or vice versa. This information may include information such as a URL or other address/location at which the media can be accessed (e.g. from the server), time location information signifying where in the media file the second device last played, and/or any other information needed by the first device to play the media seamlessly. Second device 212 may then send its media transmission parameters to server system 216 such that server system 216 can transmit the media to device 212. Local dynamic switching may also be used where media is shared locally between devices 210 and 212 (e.g. where one of devices 210 and 212 acts as a media server to the other of devices 210 and 212, where media is stored on one of devices 210 and 212 which is accessible by the other of devices 210 and 212, etc.).

Dynamic switching with media provided by a server may also be enabled by a combination of local methods and non-local methods (e.g. by both information shared between the devices and by processes performed by the server).

In addition to having dynamic switching between devices 210 and 212 that receive data through a common channel, dynamic switching may also be accomplished between devices that do not receive data through a common channel (e.g. between devices 210 and 214 and/or between devices 212 and 214).

In some embodiments, device 212 may simply pass data received from server system 216 through to device 210, and/or data received from device 210 to server system 216 (e.g. with minor processing and/or without editing the underlying information transmitted by device 210 and/or server system 216). In some embodiments, device 212 may be configured to process data (e.g. edit the information transmitted by the data) received from server system 216 before passing the data to device 210, and/or process data received from device 210 before passing the data to server system 216.

Server system 216 may allow multiple users to simultaneously access the same media. Server system 216 may be configured such that multiple users can access the same media independently (e.g. can access the media at different locations within the media, can play the media at different speeds, etc.).

In some embodiments, server system 216 can allow multiple users to jointly view the media (i.e. each user receives roughly the same media stream at the same time, which typically (but not always) includes playing the media from roughly the same location within the media, and may or may not include playing the media using the same quality settings such as frame rate, resolution, etc.). Jointly viewing a media piece may involve having the same time location within media transmitted to the devices at about the same time (e.g. the devices may receive a particular location within the media at different times due to different transmission rates), may involve having the devices receive the same time location within the media at about the same time (e.g. the server may account for differences in transmission time so that the media location is received by the devices at about the same time), and/or may involve some other joint viewing timing.

Where users can view the media jointly, server system 216 may be configured to allow one user to grant viewing and/or other rights to their user profile which may contain pointers within the media to identify the location being played within the media, server system may allow users to set up "rooms" and then each user to play the media jointly joins the room, or some other technique could be used to play media jointly. For example, a first device 210 and a second device 212 may share the media by accessing the media using a common data connection and/or receiving a common media stream, and a third device 214 may access the media by receiving time location (i.e. a time at which particular information of the media piece is conveyed within the media file containing the media) information from a user profile associated with one of the first and second devices 210, 212. Server system 216 may be configured such that it can allow a multiplicity of different users to jointly access a single media piece.

Server system 216 may also be configured such that it allows different media to be accessed by different users at different times. For example, server system 216 may provide a first type of media to a first device 210 (e.g. stream a first video to the first device) and provide a different media to a third device 214 (e.g. stream an audio broadcast or different video to the third device 214). Server system 216 may be configured such that it can send a multiplicity of different media to a multiplicity of different devices.

Either or both of first or second device 210, 212 may be any of the embodiments of device 10 disclosed herein. Also, first and second devices 210, 212 may be arranged according to any of the embodiments disclosed in U.S. patent application Ser. No. 11/105,197 entitled System And Method For Enabling A Person To Switch Use Of Computing Devices filed Apr. 12, 2005, the disclosure of which is hereby incorporated by reference to the extent that it is consistent with the present application.

In embodiments referencing devices at different resolutions, the devices may have any resolution as long as the resolutions of the two devices are not the same. Reference to high resolution and low resolution is a relative term comparing the two devices. In some (not all) of the embodiments referred to as low resolution, the device has a screen having no more than about 1 million pixels, 500,000 pixels, 350,000 pixels, 160,000 pixels, 120,000 pixels, 80,000 pixels, and/or a number less than a corresponding "high resolution" device used with the low resolution device (see, e.g. the exemplary pixel sizes for high resolution devices). In some (not all) embodiments, a low resolution device has a smaller dimension of up to 500 elements (lines, pixels, etc.), up to 350 elements, and/or up to 250 elements.

In some (not all) embodiments referred to as high resolution, the high resolution device has a screen with a resolution of at least about 300,000 pixels, 450,000 pixels, 600,000 pixels, 750,000 pixels, 1 million pixels, 2 million pixels, and/or a number greater than a corresponding "low resolution" device used with the high resolution device (see, e.g. the exemplary pixel sizes for low resolution devices). In some (not all) embodiments referred to as high resolution, the device has a screen that has a smallest dimension that has at least about 450 elements, at least about 600 elements, at least about 750 elements, at least about 1000 elements, at least about 1200 elements, and/or at least about 1800 elements.

Additionally, two devices may have the same number of pixels or other discrete display elements, but have different resolutions. For example, one device may have a screen that is wider and shorter than the screen of another device which has a screen which is skinnier and taller. These two devices may have the same number of pixels (e.g. 40,000) without having the same resolution (e.g. one device having a resolution of 200×200 and another device having a resolution of 100×400).

Server system 216 may also contain media other than playable media (video, audio, etc.) such as static media (e.g. photographs) which can be accessed by devices 210-214.

Server system 216 may include a single server, or may include multiple servers which are connected together. A media access service used by a user to access media may use a single server system 216 to provide data, or may use multiple server systems. Server system 216 typically includes at least a processing circuit 282 and a memory 280.

Figure 4:
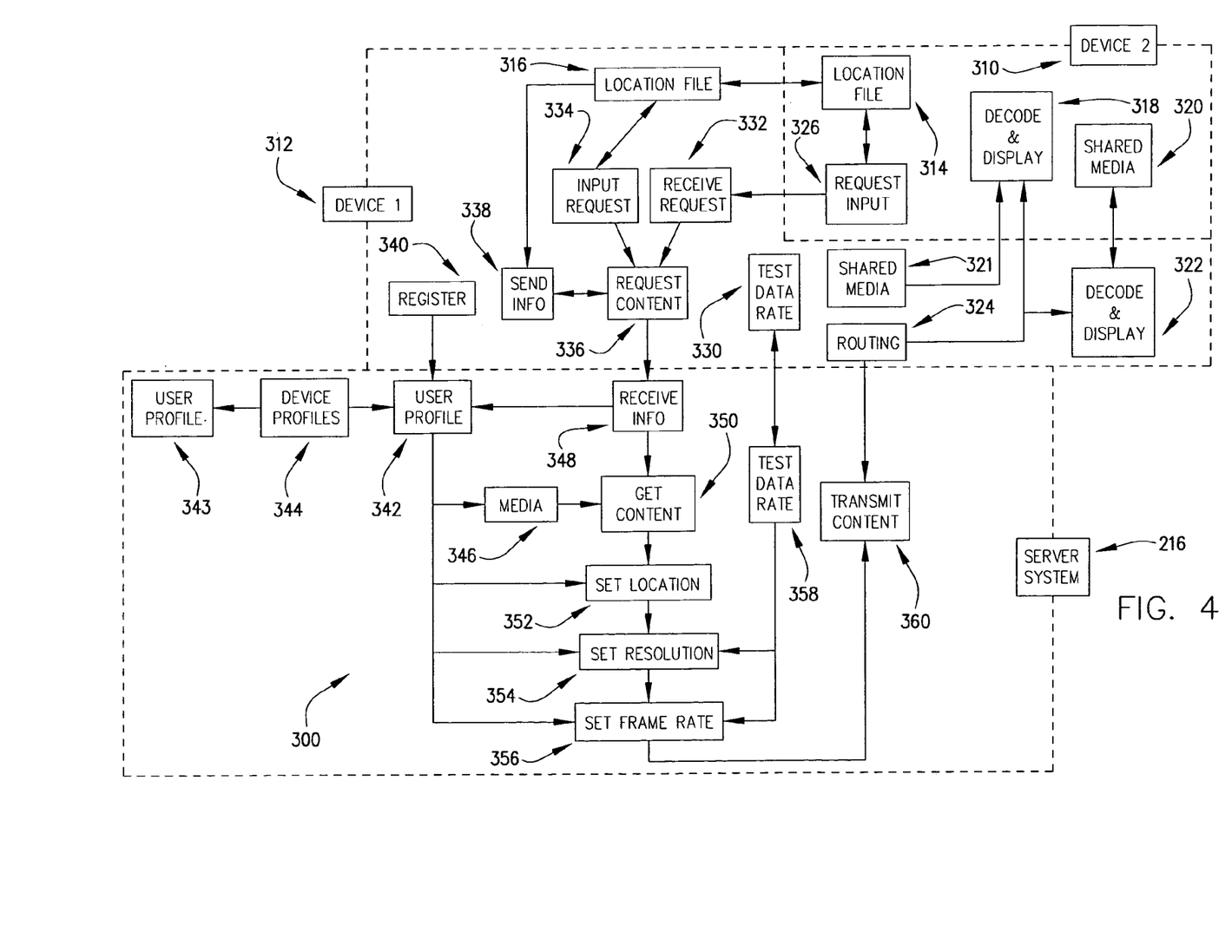
FIG. 4 includes a flow chart according to some embodiments.
Figures 5A, 5B:
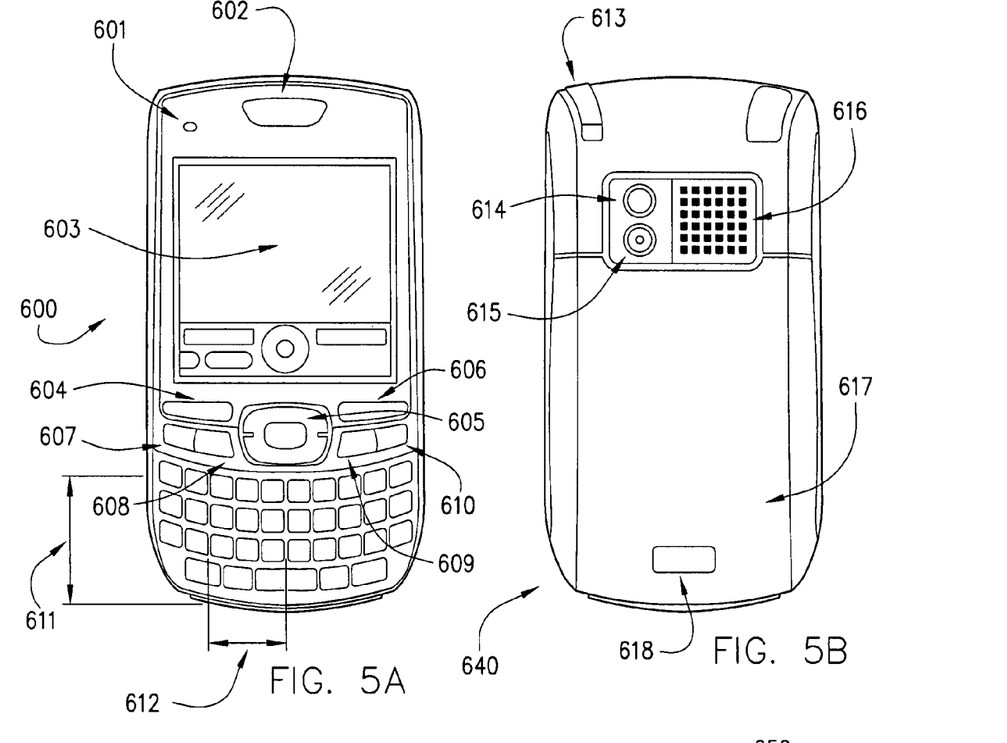
FIGS. 5A-F illustrate an exemplary device according to one embodiment.
Figure 5C:
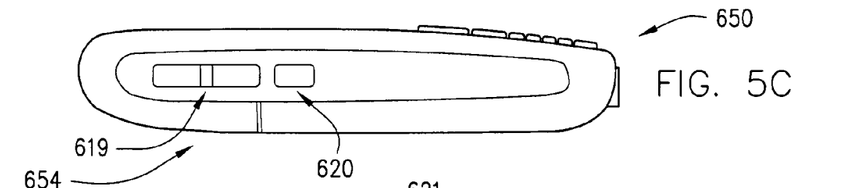
Figure 5D:
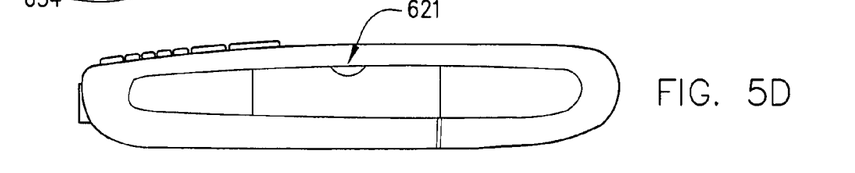
Figure 5E:
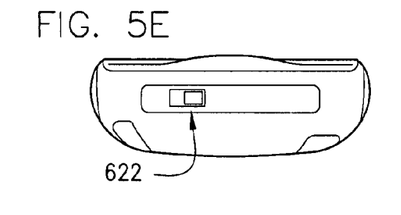
Figure 5F:
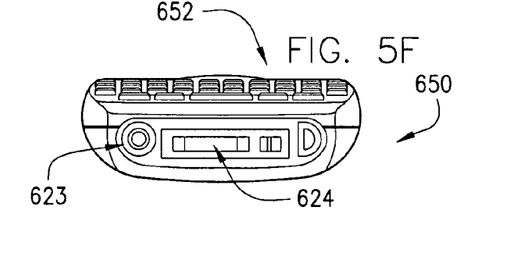

Referring to FIG. 4, a process 300 for transferring media in a media system 200 (FIG. 3) includes receiving 334 a request for media on a first device 312 (e.g. device 212 in FIG. 3) and/or receiving 326 a request for media on a second device 310 (e.g. device 210 in FIG. 3). Receiving a request 326, 334 may include receiving a user input indicating a request to access media, may include a request to log into the media server system 216, etc.

If particular media is requested 326, 334 to be played back, device 210, 212 may consult a locally stored location information file 314, 316 that stores a location in playing time of the media at which the user ended playback the last time the media was accessed, addresses (e.g. URLs or other network addresses) at which preferred or other saved media (e.g. previously viewed media) can be accessed, etc. A user may then be prompted 326, 334 about whether they would like to start receiving the media at the beginning or at the last played point, at some other point previously designated by a user or system for beginning playback, etc.

Location information files 314, 316 (or any other information relating to media) may be exchanged and/or updated directly and/or indirectly between devices 210, 212. As an example of a direct update, location information 314, 316 for devices 310, 312 may be updated any time devices 310, 312 synchronize, may be updated any time devices 310, 312 share/transfer media (e.g. all location information may be updated or only certain media—e.g. the media being shared/transferred—may be updated), etc. As an example of an indirect update, each of devices 310, 312 may receive an updated location information data from a server system 216 when that devices access server system 216.

Location information may be retained by server system 216 such that the location in server system 216 supplements location information 314, 316 and/or such that the location information in server system 216 is the only location information stored. In some embodiments, a server is used to save location information for media accessed by the server and location information files 314, 316 on the devices are used to store location information for locally stored media.

If a request is sent by a second device 310, the request may be directly sent to server system 216 (e.g. using first device 310 as a modem), or may first be received 332 and processed by the first device 312.

If the first device receives 334 a request for media itself or receives 332 a request for media from an external device, the first device will form 336 a request for media content from server system 216. The request may include a device ID (one or more pieces of data that uniquely identifies the device to server system 216) for device 310 and/or 312, media transfer parameter information relating to device 310 and/or 312, data identifying the media requested, data indicating a location within the media at which the device is requesting to start playback of the media, updates to location information files, updates to the types of media that the device can play (e.g. new codecs and/or applications installed on devices 310, 312), etc.

The request 336 sent by device 312 is received 348 by server system 216. Information received 348 can be used to access the proper user profile 342. The user profile 342 is typically a pre-existing file of server system 216 created at a time when device 210, 212 registered 340 with server system 216. The user profile may contain various types of information as discussed above (see user profile 254, FIG. 3). A user may register 340 by providing information relating to the types of devices with which the user will connect to server system 216. Server system 216 may contain generic data 344 ("general device profiles") relating to media transfer parameter capabilities of various devices. Server system 216 may access the general device profiles 344 to create the user profile 342, 343 for each user in response to registration inputs 340 received from the user. A user may further update their user profile to customize the capabilities of their device (e.g. indicating that they have installed additional media playback codecs, applications, etc.). Additionally, server system 216 may be configured to interact with devices 210-214 to identify further capabilities of devices 210-214 (e.g. searching for abilities beyond the generic capabilities of the devices). Information received 348 by server system 216 from device 310, 312 may also be used to update the user profile 342.

In use, the user profile 342 may be used to limit the media 346 available to be accessed by devices 310, 312, may be used to set 352 a location within a media file (e.g. if location information is stored by server system 216), may be used to set 354 the resolution at which the media is transferred, and/or set 356 the frame rate at which the media is transferred. The user profile could also be used to set any number of other parameters used to transfer the media (e.g. compression factor, compression format, etc.).

Once the parameters relating to transfer of the media have been set (blocks 350-356), the media is transmitted at block 360. The media may be transmitted as a media file, may be transmitted as streaming media, and/or may be transmitted in some other media transmission format. Server system 216 may be configured to transmit some media as a file and transfer other media as a stream, or any other combination of transmission formats.

Server system 216 may also set the parameters 350-356 based on other data. For example, server system 216 may be configured to test the data transfer rate between the server system 216 and device 312 (e.g. ping the device) to determine the actual data transfer rate and/or the actual resolution at which media is being played, and then adjust the resolution 354 and/or frame rate 356 of the media being transmitted 360 based on this information (e.g. to avoid pauses in the data transfer and/or to avoid requiring device 310, 312 to resize the media information). If additional data is obtained (e.g. the actual data transfer rate), the information relating to the device (e.g. resolution) may be used as maximum value parameters and/or may be used along with the additional data to set the resolution 354 and/or rate 356.

Once device 312 receives the media, device 312 may be configured to route 324 the transmitted media data based on which device requested 326, 334 media and/or which device is designated to display 318, 322 the media. Routing 324 may also include identifying which device is active. For example, if media is being played on device 310 and device 310 is no longer desired to play 318 the media (e.g. device 310 is shut down, the media viewer of device 310 is shut down, the user pushes the media to device 312, etc.), then the media may be dynamically routed to device 312. As another example, if media is being played on device 312 and device 310 becomes active (e.g. is turned on), then the media may start to be played on device 310. Device 312 may be configured to monitor device 310 to identify changes in the activity of device 310. Device 310 could also be configured to monitor device 312. These monitoring techniques could also be used even where the devices 310, 312 are in a relationship similar to devices 212 and 214 (FIG. 3) rather than in the relationship of devices 210 and 212 (FIG. 3).

If data is dynamically routed to device 312 from device 310 (or vice versa), then device 312 may send 336 an additional request for content indicating that device 312 (and not device 310)(or vice versa) is now being used to view the media. Server system 316 may be configured to adjust (e.g. dynamically adjust without a user input) the parameters 354, 356 used to transmit 360 the media in response to the change in device being used to optimize the data for transmission to device 312 (or vice versa).

In another embodiment, the transfer of media from one device to another device is handled entirely within the devices and may or may not involve the server system 216. For example, when media playback is to be transferred from one device 310, 312 to another device 310, 312, the device from which the media is being transferred may send information to the other device such that the other device can request and start playing the media (e.g. the device from which the media is being transferred may send the other device information such as a URL associated with the media, location information associated with the last viewed location, etc.).

These techniques used for transferring media related data (e.g. using or not using the server system 216) can also be used by the devices 310, 312, 214 (FIG. 3) to commonly view the same media piece at the same time.

Routing 324 media data could include providing the media data to both device 310 and device 312 such that both devices 310 and 312 will play 318, 322 the media.

Displaying media 318, 322 could include any number of steps including decoding the media data, changing the resolution of the media data, providing output signals to a display device, etc.

Devices 310, 312 may also share 320, 321 media between devices 310, 312. For example, device 310 may access media 321 stored on device 312, such that device 310 can play 318 the media. Devices 310, 312 may access one or both location files 314, 316 when playing shared media such that the shared media may be played from a last viewed (or other relevant) location. Devices 310, 312 may also access one or both location files 314, 316 when playing media stored in its own memory such that media can be played from a last viewed (or other relevant) location.

As illustrated, devices 310 and 312 interact with server system 216 through a common channel (i.e. circuitry of device 312). The common channel may be a cellular channel that uses a cellular transceiver 36 (FIG. 1) of device 312, a network channel that transmits data using a network transceiver 44 (FIG. 1) of device 312, etc.

Devices 310 and 312 may communicate directly (e.g. using a wireless and/or point-to-point protocol) or may communicate indirectly (e.g. using a network protocol that is not point-to-point, but which may be wireless).

While illustrated as operating through a common channel, any of the steps relating to devices 310 and 312 in FIG. 4 and devices 210 and 212 in FIG. 3 could be implemented between devices that are in a relationship such as that shown between devices 212 and 214 or between devices 210 and 214 in FIG. 3 (e.g. where each device 310 and 312 separately interacts with server system 216).

Additionally, while devices 310 and 312 are shown as having fixed roles, the roles of devices 310 and 312 may change. For example, device 312 may include a cellular transceiver but not a local area network transceiver (e.g. a WiFi adapter) while device 310 may have a LAN transceiver but not a cellular transceiver. In this case, if a cellular network is present but not a WiFi network, then the system may be organized as illustrated. However, if a WiFi network is present but not a cellular network, then devices 310 and 312 may have opposite roles than those illustrated.

Referring again to FIG. 1 and 4, device 312 may have one or more components similar to device 10, including one or more data transceivers configured to transmit data and a processor configured to carry out one or more of the steps shown in FIG. 4. The processor may be configured to generate output signals necessary for interaction of the components (display, transceivers, audio circuits, etc.) of device 310 including data output signals to control transmission of data, display output signals to control a display, audio output signals to control output of audio information, memory storage signals to save data in a memory, etc.

Any of the steps of device 312 may be performed by processing circuit 32 of device 10. For example, a cellular transceiver 36, network transceiver 44, or some other network access circuitry may receive signals containing media data transmitted 360 from server system 216. Processing circuit 32 may be configured to receive the data from the network access circuitry and route 324 the data. For example, processing circuit 32 may be configured to provide data output signals based on the received media data to a transmitter 44 for transmission to device 310. As another example, processing circuit 32 may be configured to decode 322 media data and provide 322 display output signals to display 14.

As another example, a transmitter 44 may receive signals transmitted by device 312 indicative of a request for media, and processing circuit 32 may be configured to receive the request and generate and provide data output signals to request 336 content to a cellular transceiver 36 and/or network transceiver 44 which transmits the data to server system 216.

Device 310 may also have components similar to device 10, including one or more data transceivers configured to transmit data and a processor configured to carry out one or more of the steps shown in FIG. 4. The processor may be configured to generate output signals necessary for interaction of the components (display, transceivers, audio circuits, etc.) of device 310.

Referring to FIGS. 3 and 4, processing circuit 282 may be configured to implement one or more of the steps of server system 216 shown in FIG. 4, and may generate signals necessary to interact with external devices (e.g. a transmitter, a receiver, a memory, another server, etc.) used to perform the steps.

Other Features

Referring again to FIG. 3, processing circuit 282 of server system 216 may include various types of processing circuitry, digital and/or analog, and may include one or more of a microprocessor, microcontroller, application-specific integrated circuit (ASIC), field programmable gate array (FPGA), or other circuitry configured to perform various input/output, control, analysis, and other functions. In various embodiments, the processing circuit 282 may include a central processing unit (CPU) using any suitable processor or logic device, such as a as a general purpose processor. Processing circuit 282 may include, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), or other processing device in accordance with the described embodiments.

Processing circuit 282 may be configured to digitize data, to filter data, to analyze data, to combine data, to output command signals, and/or to process data in some other manner. Processing circuit 282 may be configured to perform digital-to-analog conversion (DAC), analog-to-digital conversion (ADC), modulation, demodulation, encoding, decoding, encryption, decryption, etc. Processing circuit 282 (e.g. microprocessor) may be configured to execute various software programs such as application programs and system programs to provide computing and processing operations for the server system.

Processing circuit 282 may also include a memory that stores data. Processing circuit may include only one of a type of component (e.g. one microprocessor), or may contain multiple components of that type (e.g. multiple microprocessors). Processing circuit 282 could be composed of a plurality of separate circuits and discrete circuit elements. In some embodiments, processing circuit 282 will essentially comprise solid state electronic components such as a microprocessor (e.g. microcontroller). Processing circuit 282 may be mounted on a single board in a single location or may be spread throughout multiple locations which cooperate to act as processing circuit 282. In some embodiments, processing circuit 282 may be located in a single location and/or all the components of processing circuit 282 will be closely connected.

Components shown as part of a single processing circuit 282 in the figures may be parts of separate processing circuits in various embodiments covered by the claims unless limited by the claim to a single processing circuit.

Referring back to FIG. 1, portable device 10 may be a mobile computing device capable of executing software programs. The device 10 may be implemented as a combination handheld computer and mobile telephone, sometimes referred to as a smart phone. Examples of smart phones include, for example, Palm® products such as Palm® Treo™ smart phones. Although some embodiments may be described with portable device 10 implemented as a smart phone by way of example, it may be appreciated that the embodiments are not limited in this context. For example, portable device 10 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, camera, pager, messaging device, data communication device, and so forth.

Processing circuit 32 of hand-held device 10 may include one or more of a microprocessor 26, image processing circuit 16, display driver 18, NVM controller 28, audio driver 22 (e.g. D/A converter, A/D converter, an audio coder and/or decoder (codec), amplifier, etc.), and other processing circuits. Processing circuit 32 can include various types of processing circuitry, digital and/or analog, and may include one or more of a microprocessor, microcontroller, application-specific integrated circuit (ASIC), field programmable gate array (FPGA), or other circuitry configured to perform various input/output, control, analysis, and other functions. In various embodiments, the processing circuit 32 may include a central processing unit (CPU) using any suitable processor or logic device, such as a as a general purpose processor. Processing circuit 32 may include, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), or other processing device in accordance with the described embodiments.

Processing circuit 32 may be configured to digitize data, to filter data, to analyze data, to combine data, to output command signals, and/or to process data in some other manner. Processing circuit 32 may be configured to perform digital-to-analog conversion (DAC), analog-to-digital conversion (ADC), modulation, demodulation, encoding, decoding, encryption, decryption, etc. Processing circuit 32 (e.g. microprocessor 26) may be configured to execute various software programs such as application programs and system programs to provide computing and processing operations for device 10.

Processing circuit 32 may also include a memory that stores data. Processing circuit may include only one of a type of component (e.g. one microprocessor), or may contain multiple components of that type (e.g. multiple microprocessors). Processing circuit 32 could be composed of a plurality of separate circuits and discrete circuit elements. In some embodiments, processing circuit 32 will essentially comprise solid state electronic components such as a microprocessor (e.g. microcontroller). Processing circuit 32 may be mounted on a single board in a single location or may be spread throughout multiple locations which cooperate to act as processing circuit 32. In some embodiments, processing circuit 32 may be located in a single location and/or all the components of processing circuit 32 will be closely connected.

Components shown as part of a single processing circuit 32 in the figures may be parts of separate processing circuits in various embodiments covered by the claims unless limited by the claim to a single processing circuit (e.g. location circuit 24 may be part of a separate assembly having a separate microprocessor that interfaces with processing circuit 32 through data port 40).

Hand-held device 10 may also include a network transceiver 44. Transceiver 44 may operate using one or more of a LAN standard, a WLAN standard, a Bluetooth standard, a Wi-Fi standard, an Ethernet standard, and/or some other standard. Network transceiver 44 may be a wireless transceiver such as a Bluetooth transceiver and/or a wireless Ethernet transceiver. Wireless transceiver 44 may operate using an IEEE 802.11 standard. Hand-held device 10 may also include an external device connector 40 (such as a serial data port) for transferring data. External device connector 40 may also serve as the connector 52 to an external power supply. Hand-held device may contain more than one of each of transceiver 44 and external device connector 40. For example, network transceiver 44 may include both a Bluetooth and an IEEE 802.11 transceiver.

Network transceiver 44 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of wireless network systems offering data communication services may include the Institute of Electrical and Electronics Engineers (IEEE) 802.xx series of protocols, such as the IEEE 802.11a/b/g/n series of standard protocols and variants (sometimes referred to as "WiFi"), the IEEE 802.16 series of standard protocols and variants (sometimes referred to as "WiMAX"), the IEEE 802.20 series of standard protocols and variants, and so forth.

Hand-held device 10 may be capable of operating as a mobile phone. The mobile phone may use transceiver 44 and/or may use a cellular transceiver 36. Cellular transceiver 36 may be configured to operate as an analog transceiver, a digital transceiver (e.g. a GSM transceiver, a TDMA transceiver, a CDMA transceiver), or some other type of transceiver. Cellular transceiver 36 may be configured to transfer data (such as image files) and may be used to access the Internet 42 in addition to allowing voice communication. Cellular transceiver 36 may be configured to use one or more of an EV-technology (e.g. EV-DO, EV-DV, etc.), an EDGE technology, a WCDMA technology, and/or some other technology.

Transceiver 44 may be arranged to perform data communications in accordance with different types of shorter range wireless systems, such as a wireless personal area network (PAN) system. One example of a wireless PAN system offering data communication services includes a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), etc.—as well as one or more Bluetooth Profiles, etc. Other examples may include systems using an infrared technique.

Cellular transceiver 36 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth.

In addition to voice communications functionality, the cellular transceiver 36 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

Hand-held device 10 may include one or more user input devices 31 (e.g. button, switch, touch screen, keyboard, keypad, voice command circuit, etc.) for registering commands from a user on device 10. Some or all of user input devices 31 may interface with a switch control circuit (not shown) configured to interpret which switches have been actuated. User input device 31 may include an alphanumeric keyboard. The keyboard may comprise, for example, a QWERTY key layout and an integrated number dial pad. A keyboard integrated into a hand-held device would typically be a thumb keyboard. User input device 31 may also include various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. Any of user input devices 31 may be concealable behind a body (e.g. a sliding body, a flip-out body, etc.) such that they are hidden when the body is in a first position and visible when the body is in the second position.

Hand-held device 10 may include one or more location determining circuits 24 (e.g. a GPS circuit and/or a cell-based location determining circuit) configured to determine the location of device 10. Device 10 may be configured to receive inputs from more than one location determining circuit 24. These inputs can be compared such that both are used, one (e.g. a cell-based system) can be used primarily when the other (e.g. GPS) is unable to provide reliable location information, or can have some other functional relationship.

Device 10 may use one or more different location determining techniques to derive the location of the device 10 based on the data from location determining circuit 24.

For example, device 10 may use one or more of Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 10 may be arranged to operate in one or more position determination modes including, for example, a standalone mode, a mobile station (MS) assisted mode, and/or a MS-based mode. In a standalone mode, such as a standalone GPS mode, the mobile computing device 100 may be arranged to autonomously determine its position without network interaction or support. When operating in an MS-assisted mode or an MS-based mode, however, device 10 may be arranged communicate over a radio access network (e.g., UMTS radio access network) with a position determination entity (PDE) such as a location proxy server (LPS) and/or a mobile positioning center (MPC).

In an MS-assisted mode, such as an MS-assisted AGPS mode, the PDE may be arranged to determine the position of the mobile computing device. In an MS-based mode, such as an MS-based AGPS mode, device 10 may be arranged to determine its position with only limited periodic assistance from the PDE. In various implementations, device 10 and the PDE may be arranged to communicate according a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting device 10, the PDE may handle various processing operations and also may provide information to aid position determination. Examples of assisting information may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, and so forth.

In various implementations, the assisting information provided by the PDE may improve the speed of satellite acquisition and the probability of a position fix by concentrating the search for a GPS signal and/or may improve the accuracy of position determination. Each position fix or series of position fixes may be available at device 10 and/or at the PDE depending on the position determination mode. In some cases, data calls may be made and assisting information may be sent to device 10 from the PDE for every position fix. In other cases, data calls may be made and assistance information may be sent periodically and/or as needed.

Hand-held device 10 may include one or more audio circuits 20 (e.g. speakers, microphone, etc.) for providing or receiving audio information to or from a user. In one example, hand-held device 10 includes a first speaker 20 designed for regular phone operation. Hand-held device 10 may also include a second speaker 20 for louder applications such as speaker phone operation, music or other audio playback (e.g. an mp3 player application), etc. Hand-held device 10 may also include one or more audio ports 20 (e.g. a headphone connector) for output to an external speaker and/or input from an external microphone. Audio circuit 20 may be under the control of one or more audio drivers 22 which may include D/A converters and/or an amplifier.

Hand-held device 10 may include a camera 12 for taking pictures using device 10. Camera 12 may include a CCD sensor, a CMOS sensor, or some other type of image sensor capable of obtaining an image (particularly, images sensors capable of obtaining an image formed as an array of pixels). The image sensor may have a resolution of at least about 65,000 pixels or at least about 1 megapixel. In some embodiments, the image sensor may have a resolution of at least about 4 megapixels. Camera 12 may also include read-out electronics for reading data from the image sensor. Image processing circuit 16 may be coupled to the camera 12 for processing an image obtained by the camera. This image processing may include format conversion (e.g. RGB to YCbCr), white balancing, tone correction, edge correction, red-eye reduction, compression, CFA interpolation, etc. Image processing circuit 16 may be dedicated hardware that has been optimized for performing image processing.

Hand-held device 10 may include a display 14 for displaying information to a user. Display 14 could be one or more of an LCD display (e.g. a touch-sensitive color thin-film transistor (TFT) LCD screen), an electroluminescent display, a carbon-nanotube-based display, a plasma display, an organic light emitting diode (OLED) display, and some other type of display. Display 14 may be a touch screen display such that a user may input commands by approaching (e.g. touching) display 14 (including touch screens that require a specialized device to input information). Display 14 may be a color display (e.g., 16 or more bit color display) or may be a non-color (e.g. monotone) display. Display 14 may be controlled by a display driver 18 that is under the control of a microprocessor 26. In some embodiments, display 14 may be used with a stylus. Display 14 may be used as an input to a handwriting recognizer application.

Hand-held device 10 may include a dedicated memory 34 fixed to device 10. Memory 34 may be implemented using any machine-readable or computer-readable media capable of storing data such as erasable or non-erasable memory, writeable or re-writeable memory, and so forth. Dedicated memory 34 may be a non-volatile memory, may be a volatile memory, or may include both volatile and non-volatile memories. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information. In one embodiment, fixed memory 34 is a non-volatile memory.

Although the memory 34 is shown as being separate from and external to processing circuit 32 some portion or the entire memory 34 may be included on the same integrated circuit as processing circuit 32 (e.g. the same integrated circuit as microprocessor 26).

Hand-held device 10 may include a removable memory port 38 configured to receive a removable memory medium, and/or other components. Removable memory port 38 may also serve as an external device connector 40. For example, removable memory port may be an SDIO card slot which can be used to receive memory cards, receive cards input and/or output data, and combined cards having both memory and input/output functions.

Memory 34 and/or memory 38 may be arranged to store one or more software programs to be executed by processing circuit 32.

Dedicated memory 34 and removable memory 38 may be connected to and/or under the control of a common memory controller 28 such as a non-volatile memory controller. Memory controller 28 may be configured to control reading of data to and writing of data from dedicated memory 34 and/or removable memory 38.

Handheld device 10 may be configured to connect to one or more servers 46,48 via a network 42 (such as the Internet) using one or more network transceiver 44, cellular transceiver 36, and external device connector 40.

Hand-held device 10 may also include a power supply circuit 52 configured to regulate power supply in hand-held device 10. Power supply circuit 52 may be configured to do one or more of control charging of battery 56, to communicate the amount of power remaining in battery 56, determine and/or communicate whether an external power supply is connected, switch between the external power supply and the battery, etc. Battery 56 may be a rechargeable battery and may be removable or may be fixed to device 10. Battery 56 may be formed from any number of types of batteries including silver-based batteries (e.g. silver-zinc, magnesium-silver-chloride, etc.), a lithium-based battery (e.g. lithium-ion, lithium-polymer, etc.), a nickel-based battery (nickel-cadmium, nickel-metal-hydride, etc.), zinc-based batteries (e.g. silver-zinc, carbon-zinc, etc.), etc. External power supply connector 34 may be configured to be connected to a direct current source, an alternating current source, or both DC and AC sources.

Device 10 may have an optical viewfinder (not shown), may use display 14 as a digital viewfinder, may include some other type of view finder, may include multiple types of view finders, or may not include a view finder.

Device 10 may be configured to connect to the Internet 42, which may be a direct connection (e.g. using cellular transceiver 36, external device connector 40, or network transceiver 44) or may be an indirect connection (e.g. routed through external device 50). Device 10 may receive information from and/or provide information to the Internet. Device 10 may include a web browser configured to display information received from the Internet (including information which may be optimized by the browser for display on portable device 10). Device 10 may connect to one or more remote servers 46,48 using the Internet. Device 10 could also connect to another personal electronic device 50 by way of the Internet.

Device 10 may comprise an antenna system (not illustrated) for transmitting and/or receiving electrical signals. Each of the transceivers 36,44 and/or location circuit 24 may include individual antennas or may include a common antenna system. The antenna system may include or be implemented as one or more internal antennas and/or external antennas.

Portable device 10 may comprise a subscriber identity module (SIM) coupled to processing circuit 32. The SIM may comprise, for example, a removable or non-removable smart card arranged to encrypt voice and data transmissions and to store user-specific data for allowing a voice or data communications network to identify and authenticate the user. The SIM may store data such as personal settings specific to the user.

Figure 2:
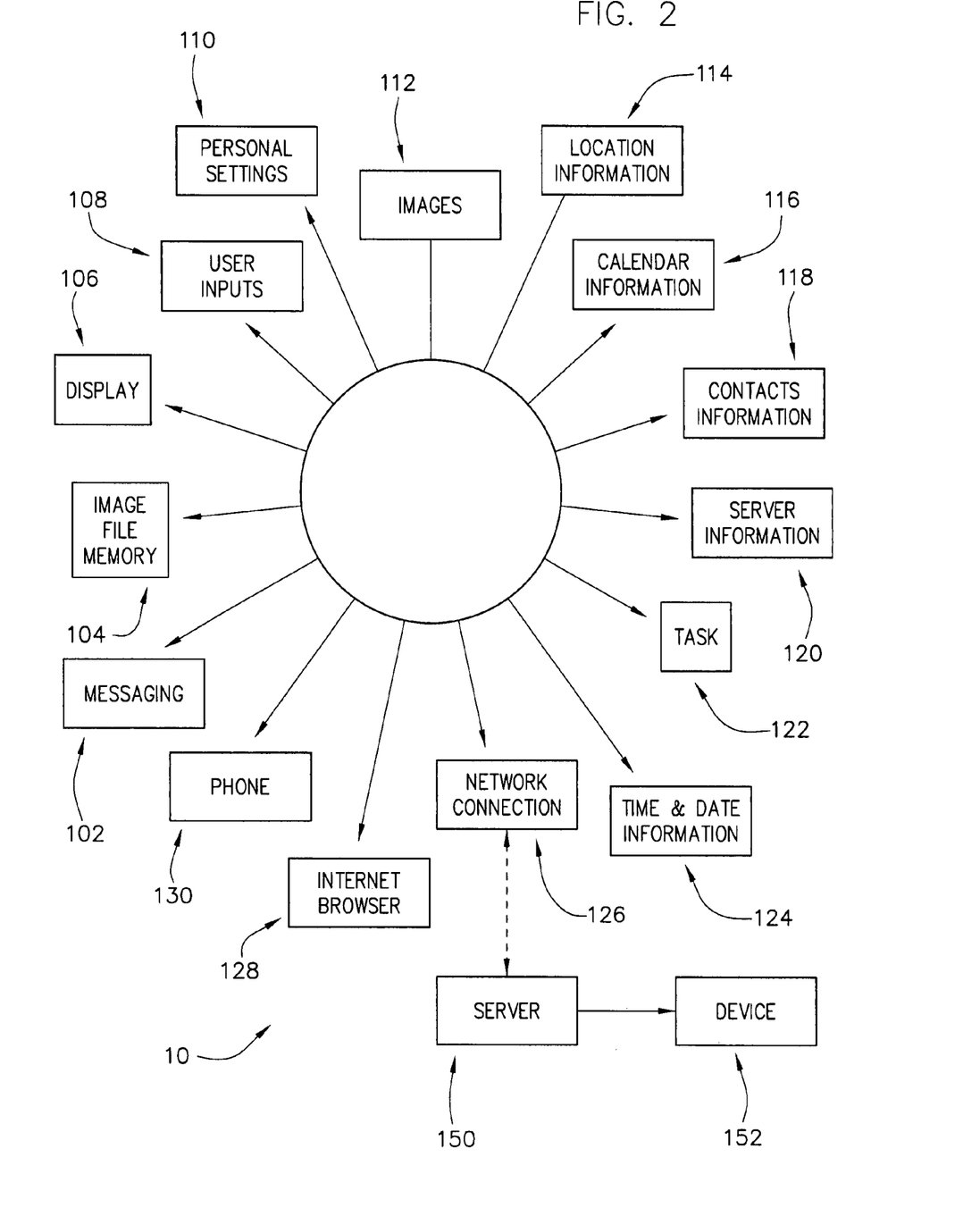
FIG. 2 is an application diagram of a device according to one embodiment.

Referring to FIG. 2, device 10 and/or processing circuit 32 may be configured to run any number of different types of applications. Examples of application programs may include, for example, a phone application 130 (e.g. a telephone application, a voicemail application, a VoIP application, etc.), a messaging application 102 (e.g. an e-mail application, an instant message (IM) application, a short message service (SMS) application, a multimedia message service (MMS) application), a web browser application 128, a personal setting application 110 (e.g. a personal information manager (PIM) application), a contact management application 118, a calendar application 116 (e.g. a calendar application, a scheduling application, etc.), a task management application 122, a document application (e.g. a word processing application, a spreadsheet application, a slide application, a document viewer application, a database application, etc.), a location application 114 (e.g. a positioning application, a navigation application, etc.), an image application 112 (e.g. a camera application such as a digital camera application and/or a video camera application, an image management application, etc.) including media player applications (e.g. a video player application, an audio player application, a multimedia player application, etc.), a gaming application, a handwriting recognition application, and so forth. The application software may provide a graphical user interface (GUI) to communicate information between the portable device 10 and a user.

Device 10 may include a location application 114. Location application 114 may be configured to calculate the current position (e.g. the rough current position) of device 10 based on data received from one or more location circuits 24. Location application 114 may be provided with map information such that it can translate coordinate positions into map positions (and vice versa). Location application 114 may be configured to provide navigational information to a user such as turn by turn directions.

Device 10 may include personal organizer applications such as a calendar application 116, a contacts application 118, and a task application (not illustrated). Calendar application 116 may allow a user to schedule events, set alarms for events, and store a wide variety of information for events (e.g. name of the event, location of the event, other attendees of the event, etc.). Contacts application 118 may allow a user to save contact information for a contact such as phone number information (which may be shared with a phone application 130), address information, group information (e.g. which user created group or groups the contact belongs to), and other information about the contact. The task application allows a user to keep track of pending and/or completed tasks.

Device 10 may include an internal clock application 124 that keeps track of time information (such as current time of day and/or date), time zone information, daylight savings time information, etc. Clock application 124 may be a program running based on data from an internal clock of microprocessor 26, data from a separate clock/timing circuit, or data from some other circuit.

Device 10 may also include one or more network connection protocol applications 126 that allow a user to transfer data over one or more networks. Network application 126 may be configured to allow device 10 to access a remote device such as server 46,48.

Device 10 may include an Internet browser application 128 that allows a user to browse the internet. The Internet browser application may be configured to alter the data received from Internet sites so that the data can be easily viewed on portable device 10.

Device 10 may include a phone application 130 configured to allow a user to make phone calls. Phone application 130 may use contact information from contact application 118 to place phone calls.

Device 10 may also include one or more messaging applications 102 that allow a user to send and/or receive messages such as text messages, multi-media messages, e-mails, etc. E-mail messages may come from a server which may use a Push technology and/or may use a pull technology (e.g. POP3, IMAP, etc.).

Any of the information discussed above for any of the applications (e.g. applications 102-128) may be added to or otherwise associated with an image file.

Referring to FIGS. 1 and 5A-5F, a hand-held portable computing device 600 (e.g. smartphone) includes a number of user input devices 31. The user input devices include a send button 604 configured to select options appearing on display 603 and/or send messages, a 5-way navigator 605 configured to navigate through options appearing on display 603, a power/end button 606 configured to select options appearing on display 603 and to turn on display 603, a phone button 607 usable to access a phone application screen, a calendar button 608 usable to access a calendar application screen, a messaging button 609 usable to access a messaging application screen, an applications button 610 usable to access a screen showing available applications, a thumb keyboard 611 (which includes a phone dial pad 612 usable to dial during a phone application), a volume button 619 usable to adjust the volume of audio output of device 600, a customizeable button 620 which a user may customize to perform various functions, a ringer switch 622 usable to switch the smartphone from one mode to another mode (such as switching from a normal ringer mode to a meeting ringer mode), and a touch screen display 603 usable to select control options displayed on display 603. Touch screen display 603 is also a color LCD display 14 having a TFT matrix.

Smartphone 600 also includes audio circuits 20. The audio circuits 20 include phone speaker 602 usable to listen to information in a normal phone mode, external speaker 616 louder than the phone speaker (e.g. for listening to music, for a speakerphone mode, etc.), headset jack 623 to which a user can attach an external headset which may include a speaker and/or a microphone, and microphone 625 which can be used to pick up audio information such as the user's end of a conversation during a phone call.

Smartphone 600 also includes a status indicator 601 that can be used to indicate the status of Smartphone 600 (such as messages pending, charging, low battery, etc.), a stylus slot 613 for receiving a stylus such as a stylus usable to input data on touch screen display 603, a digital camera 615 (see camera 12) usable to capture images, a mirror 614 positioned proximate camera 615 such that a user may view themselves in mirror 614 when taking a picture of themselves using camera 615, a removable battery 618 (see battery 56), and a connector 624 (see external data connector 40 and external power supply 34) which can be used to connect device 600 to either (or both) an external power supply such as a wall outlet or battery charger or an external device such as a personal computer, a gps unit, a display unit, or some other external device.

Smartphone 600 also includes an expansion slot 621 (see removable memory 38) which may be used to receive a memory card and/or a device which communicates data through slot 621, and a SIM card slot 617, located behind battery 618, configured to receive a SIM card or other card that allows the user to access a cellular network.

In various embodiments device 10 and device 600 may include a housing 640. Housing 640 could be any size, shape, and dimension. In some embodiments, housing 640 has a width 652 (shorter dimension) of no more than about 200 mm or no more than about 100 mm. According to some of these embodiments, housing 640 has a width 652 of no more than about 85 mm or no more than about 65 mm. According to some embodiments, housing 640 has a width 652 of at least about 30 mm or at least about 50 mm. According to some of these embodiments, housing 640 has a width 652 of at least about 55 mm.

In some embodiments, housing 640 has a length 654 (longer dimension) of no more than about 200 mm or no more than about 150 mm. According to some of these embodiments, housing 640 has a length 654 of no more than about 135 mm or no more than about 125 mm. According to some embodiments, housing 640 has a length 654 of at least about 70 mm or at least about 100 mm. According to some of these embodiments, housing 640 has a length 654 of at least about 110 mm.

In some embodiments, housing 640 has a thickness 650 (smallest dimension) of no more than about 150 mm or no more than about 50 mm. According to some of these embodiments, housing 640 has a thickness 650 of no more than about 30 mm or no more than about 25 mm. According to some embodiments, housing 640 has a thickness 650 of at least about 10 mm or at least about 15 mm. According to some of these embodiments, housing 640 has a thickness 650 of at least about 50 mm.

While described with regards to a hand-held device, many embodiments are usable with portable devices which are not handheld and/or with non-portable devices/systems.

The various single applications discussed above may be performed by multiple applications where more than one application performs all of the functions discussed for the application or where one application only performs some of the functions discussed for the application. For example, the image application 112 may be divided into an image capturing application and a separate image viewing application. Also, more than one application may be included on device 10 that is capable of displaying images as described for image application 112.

Further, while shown as separate applications above, many of the above listed applications can be combined into single applications that perform all or some of the functions listed for more than one of the applications discussed above.

While some components in FIG. 1 were discussed as being singular and others were discussed as being plural, the invention is not limited to devices having these same numbers of each type of component. Embodiments are conceived where each combination of plural and singular components exist.

In some embodiments, the various components shown in FIG. 1 may be combined in a single component. For example, in some embodiments, removable memory 38 may also be an external device connector 40 (such as an SDIO card slot which can be used to receive memory cards, input and/or output data, and combined devices having both memory and input/output functions). As another example, in some embodiments, a single connector could serve as both an external device connector 40 and as a connection to an external power supply 34.

Also, in some embodiments, the function of various claim components shown in FIG. 1 may be performed by a combination of distinct electrical components. For instance, a location circuit 24 may have a separate microprocessor that works in combination with the main microprocessor 26 of the system to perform the functions of the processing circuit 32. As another example, image processing circuit 16 may make use of the electronics of camera 12 to perform image processing, while also having other, discrete electronic components.

A number of references have been made to transmitters, receivers, and/or transceivers. Each reference to a transmitter or receiver is equally applicable to a transceiver. Reference in the claim to a transmitter or receiver is also a reference to a transceiver unless it is explicitly stated that the claim is referencing an independent transmitter or receiver. Reference to functions achieved by a transceiver above could also be accomplished by combining an independent transmitter and receiver. Reference in the claims to a transceiver can also be a reference to a transmitter-receiver combination unless reference is made in the claim to a "unitary transceiver."

A media piece is all or a portion (e.g. all or a clip) of a media that conveys particular information. Two devices may obtain a single media piece from different files. Even though different files are being used, the media piece is the same media piece unless the claim specifically requires that a media piece be provided from a common media file. Two media files may contain overlapping subpieces. To the extent that the subpieces are being referenced, those subpieces are the same media piece regardless of whether the files from which the subpieces are played contain additional information not in the other file so long as those subpieces portray substantially the same information.

A media piece that is essentially the same media piece will be considered the same media piece for purpose of the claim unless the claim recites that one media piece is identical to a previously recited media piece. An "altered media piece" for purposes of the claim is a media piece that has been altered beyond the point of being essentially the same media piece as before the alteration.

What is claimed is:

1. A system comprising a first device, the first device comprising:
   a processing circuit;
   network access circuitry to receive media data transmitted from a remote server;
   a display having a first resolution to display media from the remote server based on signals received from the processing circuit;

a memory storing instructions that, when executed by the processing circuit, causes the processing circuit to:
  access the remote server,
  receive data indicative of a request to play media on the display of the first device,
  receive data from a second device indicative of a request to play media on a display of the second device, the display of the second device having a second resolution different than the first resolution,
  provide data to the remote server indicative of a resolution at which to transmit the media based on at least one of the data indicative of the request to play media on the display of the first device or the data from the second device indicative of the request to play media on the display of the second device, the remote server storing one or more profiles that includes data relating to capabilities of one or more devices capable of connecting to the remote server, wherein the remote server determines at least one capability of at least the first device or the second device based on the one or more profiles,
  receive media data from the remote server based at least in part on the data provided to the remote server,
  provide signals to the display of the first device based on the media data received from the remote server and based on the data indicative of the request to play media on the display of the first device, and
  provide data output signals to a wireless transmitter based on the media data received from the remote server and based on the data from the second device indicative of the request to play media on the display of the second device;
  wherein the wireless transmitter is configured to transmit signals containing media data to the second device based on the output signals provided by the processing circuit.

2. The system of claim 1, wherein the wireless transmitter is separate from the network access circuitry.

3. The system of claim 1, wherein the instructions cause the processing circuit to provide data to the server indicative of a resolution at which to provide the media by providing device identification data to the server.

4. The system of claim 1, wherein the instructions cause the processing circuit to provide both the signals to the display of the first device and the data output signals to the wireless transmitter at a same time based on the media data received from the remote server.

5. The system of claim 1, wherein the wireless transmitter operates under a Bluetooth protocol, and wherein the first device communicates with the second device using the Bluetooth protocol.

6. The system of claim 1, wherein the processing circuit accesses the remote server in response to a user logging in to the remote server.

7. The system of claim 1, wherein at least the first device or the second device is a mobile computing device.

8. A method for operating a first device, the method being performed by one or more processors and comprising:
  receiving data indicative of a request to play media on a display of the first device, the display having a first resolution;
  receiving data from a second device indicative of a request to play media on a display of the second device, the display of the second device having a second resolution different than the first resolution;
  providing data to a remote server indicative of a resolution at which to transmit the media based on at least one of the data indicative of the request to play media on the display of the first device or the data from the second device indicative of the request to play media on the display of the second device, the remote server storing one or more profiles that includes data relating to capabilities of one or more devices capable of connecting to the remote server, wherein the remote server determines at least one capability of at least the first device or the second device based on the one or more profiles;
  receiving media data from the remote server based at least in part on the data provided to the remote server;
  providing signals to the display of the first device based on the media data received from the remote server and based on the data indicative of the request to play media on the display of the first device; and
  providing data output signals to a wireless transceiver based on the media data received from the remote server and based on the data from the second device indicative of the request to play media on the display of the second device.

9. The method of claim 8, wherein receiving data from a second device indicative of a request to play media on a display of the second device includes receiving data over the wireless transceiver of the first device, the wireless transceiver operating under a Bluetooth protocol.

10. The method of claim 9, wherein providing data output signals to a wireless transmitter includes providing data over the wireless transceiver of the first device using the Bluetooth protocol.

11. The method of claim 8, wherein providing the signals to the display of the first device and providing the data output signals to the wireless transmitter is performed concurrently.

12. A non-transitory computer-readable medium storing instructions that, when executed by a processor of a first device, causes the processor to:
  receive data indicative of a request to play media on a display of the first device, the display having a first resolution;
  receive data from a second device indicative of a request to play media on a display of the second device, the display of the second device having a second resolution different than the first resolution;
  provide data to a remote server indicative of a resolution at which to transmit the media based on at least one of the data indicative of the request to play media on the display of the first device or the data from the second device indicative of the request to play media on the display of the second device, the remote server storing one or more profiles that includes data relating to capabilities of one or more devices capable of connecting to the remote server, wherein the remote server determines at least one capability of at least the first device or the second device based on the one or more profiles;
  receive media data from the remote server based at least in part on the data provided to the remote server;
  provide signals to the display of the first device based on the media data received from the remote server and based on the data indicative of the request to play media on the display of the first device; and
  provide data output signals to a wireless transceiver based on the media data received from the remote server and based on the data from the second device indicative of the request to play media on the display of the second device.

13. The non-transitory computer-readable medium of claim 12, wherein the instructions cause the processor to receive data from a second device indicative of a request to play media on a display of the second device by receiving data over the wireless transceiver of the first device, the wireless transceiver operating under a Bluetooth protocol.

14. The non-transitory computer-readable medium of claim 13, wherein the instructions cause the processor to provide data output signals to a wireless transmitter by providing data over the wireless transceiver of the first device using the Bluetooth protocol.

15. The non-transitory computer-readable medium of claim 13, wherein the instructions cause the processor to provide the signals to the display of the first device and provide the data output signals to the wireless transmitter concurrently.

* * * * *